US011155072B2

(12) United States Patent
Sands et al.

(10) Patent No.: US 11,155,072 B2
(45) Date of Patent: *Oct. 26, 2021

(54) METHODS FOR FINE FEATURE DETAIL FOR ADDITIVE MANUFACTURING

(71) Applicant: General Electric Company, Schenectady, NY (US)

(72) Inventors: Travis Gene Sands, Cincinnati, OH (US); Jerod Curtis Kruse, Dayton, OH (US); Johnny Deleon, Mason, OH (US); Cory Riffe, Columbus, OH (US)

(73) Assignee: General Electric Company, Schenectady, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/574,547

(22) Filed: Sep. 18, 2019

(65) Prior Publication Data

US 2020/0009849 A1 Jan. 9, 2020

Related U.S. Application Data

(63) Continuation of application No. 15/236,102, filed on Aug. 12, 2016, now Pat. No. 10,434,759.

(51) Int. Cl.
*B29C 64/386* (2017.01)
*B33Y 10/00* (2015.01)
*B33Y 50/00* (2015.01)
*B29C 64/135* (2017.01)
*B33Y 30/00* (2015.01)
(Continued)

(52) U.S. Cl.
CPC ............ *B33Y 10/00* (2014.12); *B29C 64/135* (2017.08); *B29C 64/386* (2017.08); *B33Y 30/00* (2014.12); *B33Y 50/00* (2014.12); *B33Y 50/02* (2014.12); *B33Y 80/00* (2014.12); *B29K 2105/0058* (2013.01); *B29L 2031/082* (2013.01)

(58) Field of Classification Search
CPC ...... B29C 64/386; B29C 64/393; B33Y 50/02
See application file for complete search history.

(56) References Cited

U.S. PATENT DOCUMENTS

| | | | |
|---|---|---|---|
| 4,863,538 | A | 9/1989 | Deckard |
| 5,184,307 | A | 2/1993 | Hull et al. |

(Continued)

FOREIGN PATENT DOCUMENTS

| | | | |
|---|---|---|---|
| CN | 102419512 A | 4/2012 | |
| CN | 104999080 A | 10/2015 | |

(Continued)

OTHER PUBLICATIONS

Machine Translated Japanese Office Action Corresponding to Application No. 2019507822 dated Feb. 7, 2020.

(Continued)

*Primary Examiner* — James Sanders
(74) *Attorney, Agent, or Firm* — Dority & Manning, P.A.

(57) ABSTRACT

The present disclosure generally relates to methods for additive manufacturing (AM) that utilize a computer aided design (CAD) model of a part to develop a layer representation of the part. The method includes: determining a build layer thickness of an additive manufacturing apparatus; identifying a feature of the part within the model; determining that the feature is not aligned along the z-axis based on the build layer thickness; and moving the feature within the model along the z-axis by a feature offset such that the feature is aligned along the z-axis.

20 Claims, 7 Drawing Sheets

(51) Int. Cl.
  *B33Y 50/02* (2015.01)
  *B33Y 80/00* (2015.01)
  *B29K 105/00* (2006.01)
  *B29L 31/08* (2006.01)

(56) References Cited

U.S. PATENT DOCUMENTS

| | | | |
|---|---|---|---|
| 5,256,340 | A | 10/1993 | Allison et al. |
| 5,460,758 | A | 10/1995 | Langer et al. |
| 5,855,718 | A | 1/1999 | Nguyen et al. |
| 6,366,825 | B1 | 4/2002 | Smalley et al. |
| 6,532,394 | B1 | 3/2003 | Earl et al. |
| 6,678,571 | B1 | 1/2004 | Manners et al. |
| 9,079,357 | B2 | 7/2015 | Ebert et al. |
| 2010/0003619 | A1 | 1/2010 | Das et al. |
| 2011/0310370 | A1 | 12/2011 | Rohner et al. |
| 2013/0313756 | A1 | 11/2013 | Chen et al. |
| 2014/0324206 | A1 | 10/2014 | Napadensky |
| 2016/0167302 | A1 | 6/2016 | Deiss et al. |

FOREIGN PATENT DOCUMENTS

| | | |
|---|---|---|
| CN | 105377534 A | 3/2016 |
| EP | 1170115 A2 | 1/2002 |
| JP | 2002/067175 A | 3/2002 |
| WO | WO2010/045950 A1 | 4/2010 |
| WO | WO2013/173733 A1 | 11/2013 |

OTHER PUBLICATIONS

European Search Report Corresponding to Application No. 19214836 dated Mar. 26, 2020.
Chinese Office Action and Search Report Corresponding to Application No. 201780049539 dated Jun. 29, 2020.
PCT ISR Corresponding to PCT/US2017/042339 dated Oct. 6, 2017.

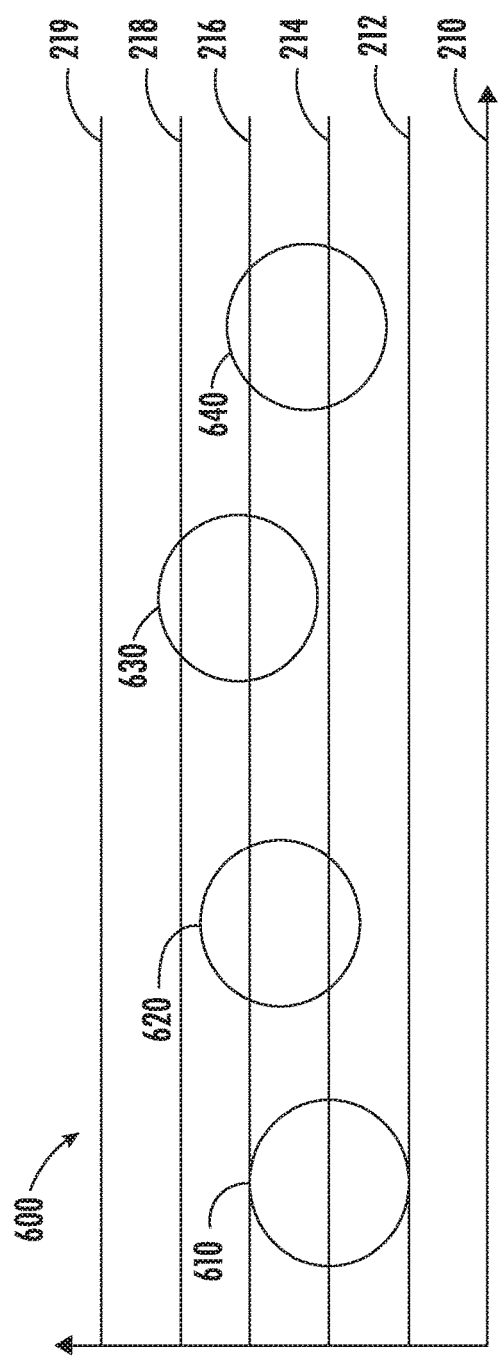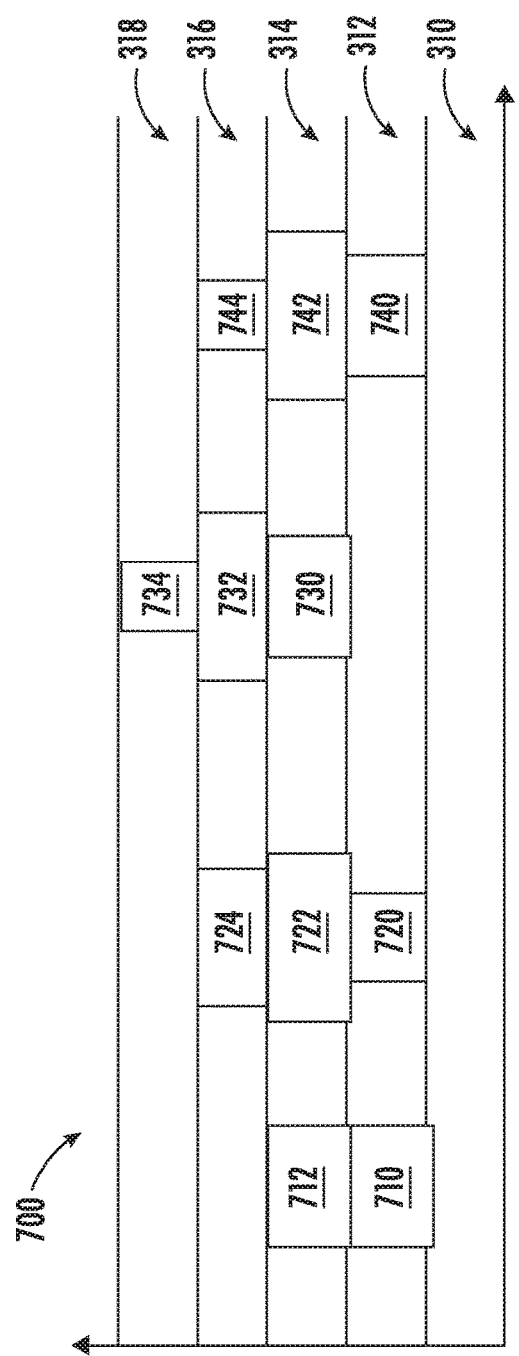

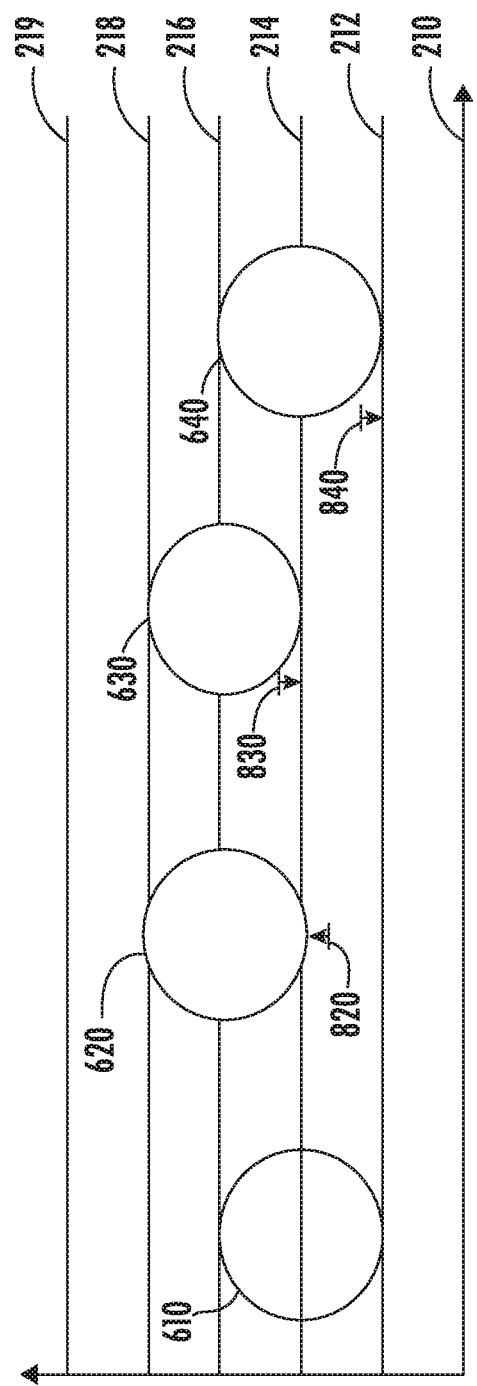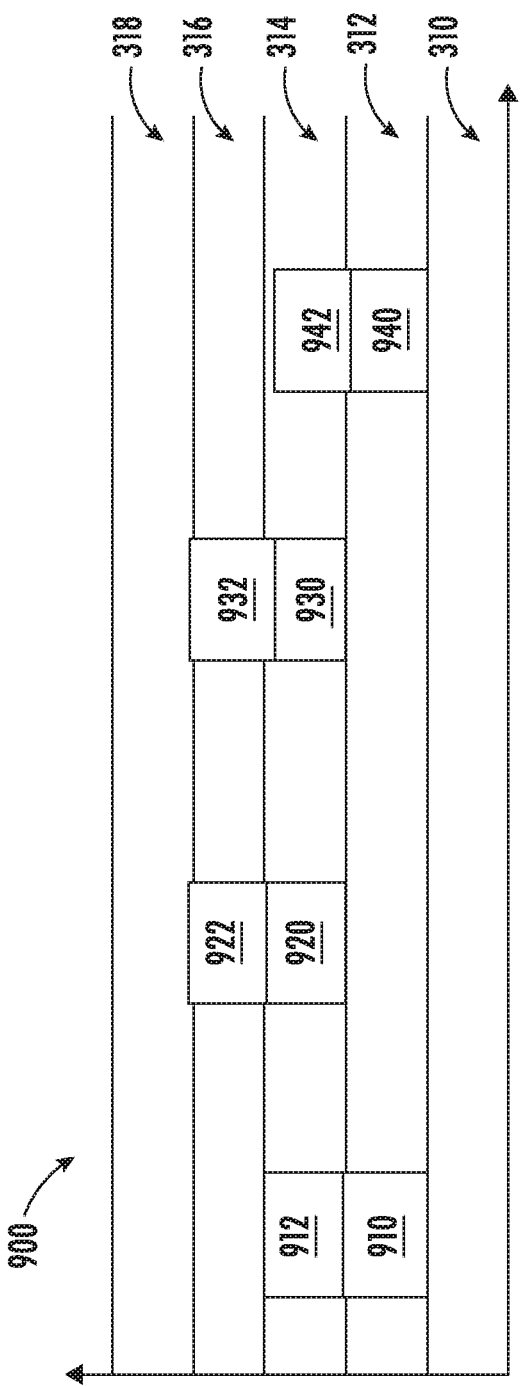

METHODS FOR FINE FEATURE DETAIL FOR ADDITIVE MANUFACTURING

CROSS-REFERENCE TO RELATED APPLICATION

This application is a continuation application of U.S. application Ser. No. 15/236,102 filed Aug. 12, 2016, titled "METHODS FOR FINE FEATURE DETAIL FOR ADDITIVE MANUFACTURING," herein incorporated by reference.

INTRODUCTION

The present disclosure generally relates to methods for additive manufacturing (AM) based on computer aided design (CAD) models.

BACKGROUND

AM processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to solidify a photopolymer, creating a solid three-dimensional object.

FIG. 1 is schematic diagram showing a perspective view of an exemplary conventional apparatus 100 for additive manufacturing. The apparatus 100 uses selective laser activation (SLA) such as disclosed in U.S. Pat. No. 5,256,340, assigned to 3D Systems, Inc. to form a part 130 as a series of layers. The apparatus 100 includes a vat 110 that holds a liquid photopolymer 112. A build plate 116 is oriented in an x-y plane and forms the base upon which the part 130 is formed. An elevator 114 moves the build plate 116 along a z-axis orthogonal to the x-y plane. A sweeper 118 spreads the liquid photopolymer 112 across the build plate 116 and previously solidified layers of the part 130.

A laser 120 provides a laser beam 126 that solidifies the liquid photopolymer 112 according to a curing depth, which generally corresponds to a layer thickness. Lenses 122 adjust properties of the laser beam 126 such as beam width. A scanning mirror 124 reflects the laser beam 126 at various angles to scan a pattern in a top layer of the liquid photopolymer 112. The apparatus 100 is under the control of a computer (not shown) that directs the scanning mirror 124 as well as the elevator 118 and laser 120. The computer controls the apparatus 100 such that the laser 120 solidifies a scan pattern in the top layer of the liquid photopolymer 112. The elevator 114 then moves the build plate 116 downward along the z-axis and the sweeper 118 spreads the liquid photopolymer 112 to form a new top layer above the previously solidified photopolymer. The process continues layer by layer until the part 130 is formed on the build plate 116.

Various additive manufacturing apparatuses operate on a slice-based modelling technique. For example, as described in U.S. Pat. No. 5,184,307, a stereolithography system will typically form a three-dimensional part in accordance with a corresponding object representation, which representation may be formed in a CAD system or the like. Before such a representation can be used, however, it must be sliced into a plurality of layer representations. The stereolithography system will then, in the course of building up the object in a stepwise layer-by-layer manner, selectively expose the untransformed layers of material in accordance with the layer representations to form the object layers, and thus, the object itself.

Although various attempts have been made to optimize the slicing techniques to provide fidelity to the object representation, any layer based manufacturing technique is limited in fidelity by the resolution of each layer. When the object representation includes features having details on the level of the resolution of a layer, slicing techniques have an unpredictable effect on the fidelity of the layer representation to the object representation. For example, the inventors of the present application have discovered that when identical features are located arbitrarily within the object representation along a z-axis, the slicing technique may generate different layer representations of the same feature.

In view of the above, it can be appreciated that there are problems, shortcomings or disadvantages associated with AM techniques, and that it would be desirable if improved methods of representing objects for AM were available.

SUMMARY

The following presents a simplified summary of one or more aspects of the invention in order to provide a basic understanding of such aspects. This summary is not an extensive overview of all contemplated aspects, and is intended to neither identify key or critical elements of all aspects nor delineate the scope of any or all aspects. Its purpose is to present some concepts of one or more aspects in a simplified form as a prelude to the more detailed description that is presented later.

In one aspect, the disclosure provides a method of manufacturing a part in a series of layers based on a three dimensional model of the part having a first scale, the model of the part oriented according to an x-y build plane corresponding to an orientation of a layer of the part and a z-axis orthogonal to the x-y build plane that defines an order of each layer of the part. The method includes: determining a build layer thickness of an additive manufacturing apparatus; identifying a feature of the part within the model; determining that the feature is not aligned along the z-axis based on the build layer thickness; and moving the feature within the model along the z-axis by a feature offset such that the feature is aligned along the z-axis.

In another aspect, the disclosure provides another method of manufacturing a part in a series of layers based on a three dimensional model of the part, the model of the part oriented according to an x-y build plane corresponding to an orientation of a layer of the part and a z-axis orthogonal to the x-y build plane that defines an order of each layer of the part. The method includes determining a build layer thickness of an additive manufacturing apparatus. The method further includes identifying a feature of the part within the model. The method also includes determining that the feature is not aligned along the z-axis based on the build layer thickness. The method also includes moving the feature within the model along the z-axis by a feature offset such that the feature is aligned along the z-axis. The method also includes building the feature according to the model on a layer by layer basis, each including layers having the build layer thickness.

In another aspect, the disclosure provides a non-transitory computer-readable medium comprising computer executable code for manufacturing a part in a series of layers based on a three dimensional model of the part having a first scale, the model of the part oriented according to an x-y build plane corresponding to an orientation of a layer of the part and a z-axis orthogonal to the x-y build plane that defines an order of each layer of the part. The code is configured to: determine a build layer thickness of an additive manufacturing apparatus; identify a feature of the part within the model; determine that the feature is not aligned along the z-axis based on the build layer thickness; move the feature within the model along the z-axis by a feature offset such that the feature is aligned along the z-axis; and build the feature according to the model on a layer by layer basis, each layer having the build layer thickness.

In another aspect, the disclosure provides an additive manufacturing apparatus. The additive manufacturing apparatus includes: a container that stores a raw material, a radiation source that solidifies the raw material when applied to the raw material, a scanner that applies the radiation source to portions of the raw material within a current layer to form a portion of an object, and an elevator that moves the raw material or the object to change the current layer. The apparatus also includes a memory storing executable instructions and a processor communicatively coupled to the memory. The processor is configured to: receive a model of a part, the model of the part oriented according to an x-y build plane corresponding to an orientation of a layer of the part and a z-axis orthogonal to the x-y build plane that defines an order of each layer of the part; determine a build layer thickness of the additive manufacturing apparatus; identify a feature of the part within the model; determine that the feature is not aligned along the z-axis based on the build layer thickness; move the feature within the model along the z-axis by a feature offset such that the feature is aligned along the z-axis; and build the feature according to the model on a layer by layer basis, each layer having the build layer thickness.

In another aspect, the disclosure provides for a part. The part may be manufactured according to the above methods or using the above described apparatus. The part includes a plurality of substantially identical features arranged at varying heights on a body of the part, each of the plurality of substantially identical features being oriented in a same orientation with respect to a vertical axis. A bottom-most point of each of the plurality of substantially identical features is spaced a multiple of a build layer thickness from a bottom of the body. The build layer thickness is at least 0.002 inches, but less than 10 times a height of each of the plurality of substantially identical features.

These and other aspects of the invention will become more fully understood upon a review of the detailed description, which follows.

BRIEF DESCRIPTION OF THE DRAWINGS

FIG. 6 illustrates a schematic diagram showing object representations of a plurality of features.

FIG. 7 illustrates a schematic diagram showing varying layer representations of the plurality of features in FIG. 6.

FIG. 8 illustrates a schematic diagram showing adjustments to the object representation of FIG. 6.

FIG. 9 illustrates a schematic diagram showing a layer representation of the adjusted object representation in FIG. 8.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Figure 2:
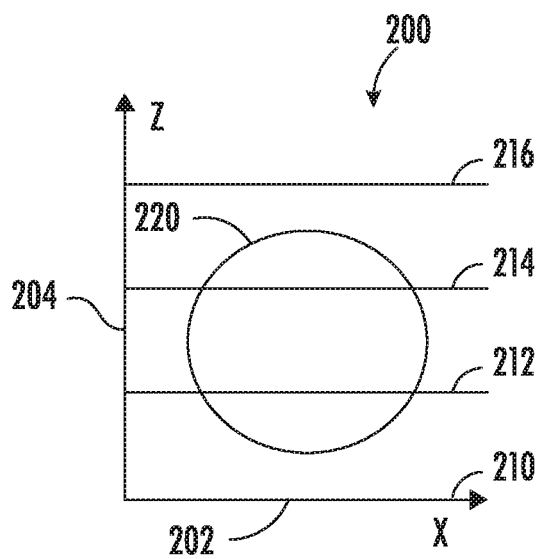
FIG. 2 illustrates a schematic diagram showing an object representation of a feature.

FIG. 2 illustrates a schematic diagram showing an object representation 200 of a feature 220. The feature 220 is illustrated as a cross-sectional view of the x-z plane defined by the x-axis and the z-axis. It should be appreciated that the feature 220 also extends along the y-axis orthogonal to the x-z plane. In this example, the feature 220 is illustrated as a circle, but it should be appreciated that the techniques discussed herein are applicable to any feature shape.

The object representation is generated in a CAD program. The CAD program has a first object scale and a first level of precision. For example, a CAD program may define features with a level of precision of mils (1/1000 inch) or micrometers (μm). When the object representation is used in an Additive Manufacturing (AM) process, however, the AM apparatus represents the object as a plurality of layers. Each layer is in the x-y plane. The z-axis 204 defines the order of the layers. The AM apparatus has a second object scale and a second layer of precision. For example, the AM apparatus may have a maximum possible build dimension and scale the object to fit the maximum possible build dimension. Further, the AM apparatus may be limited in precision due to mechanical controls. For example, the elevator 118 may move in discrete layers having a build layer thickness. In an aspect, there is a scaling factor between the CAD program and the AM apparatus. The scaling factor may be a ratio between the first scale used in the CAD program and the second scale used in the AM apparatus. In the case where the AM apparatus scales the CAD model to fit within a maximum build dimension, the scaling factor is the same as the scaling factor applied by the AM apparatus. Generally, the AM apparatus includes control software for converting an object representation to a layer representation according to a slicing algorithm. As shown in FIG. 2, the slicing algorithm defines a plurality of slices 210, 212, 214, 216. The locations of the slices are determined by the AM apparatus based on the build layer thickness. A CAD program can determine the location of the slices by scaling the build layer thickness of the AM apparatus to the first scale of the CAD program. For example, the CAD program can divide the build layer thickness by the scaling factor to determine a build layer thickness in the CAD model.

Figure 3:
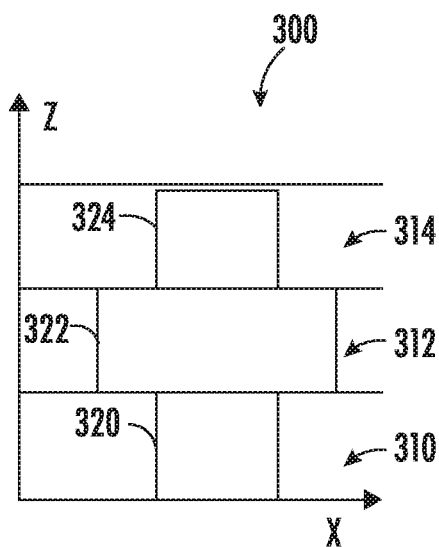
FIG. 3 illustrates a schematic diagram showing a layer representation of the feature in FIG. 2.

FIG. 3 illustrates a schematic diagram showing a layer representation 300 of the feature 200 after slicing by a slicing algorithm. In this example, the slicing algorithm uses an average object length of adjacent slices to determine a slice length for a layer between the two slices. For example, the feature 220 is sliced into layer representation 320 in layer 310, layer representation 322 in layer 312, and layer representation 324 in layer 314. Each layer representation has a length along the x-axis 202. The slicing algorithm would also determine a y-axis dimension for each slice. Because the AM apparatus and the slicing algorithm operate in discrete slices, even though the feature 220 does not extend to the slice 210, the layer representation 320 extends throughout the height of layer 310 in the z-dimension. Similarly, the layer representation 324 extends throughout the height of layer 314. As illustrated, this slicing tends to slightly distort the feature in the final part in the z-dimension. Although the distortion is on the magnitude of the height of a single layer, for fine features that are on the scale of single digit layers, the distortion may be significant.

Figure 4:
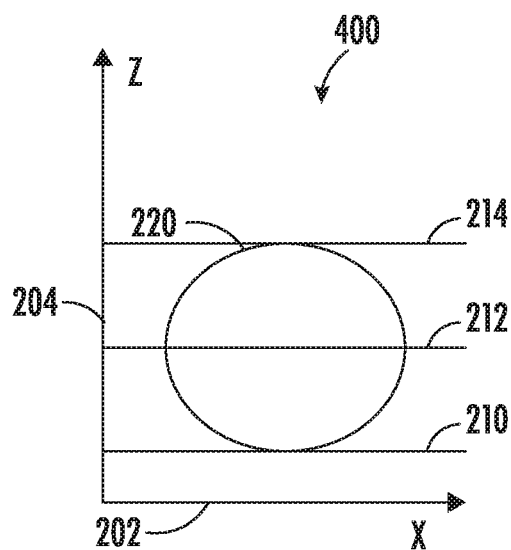
FIG. 4 illustrates a schematic diagram showing another object representation of the feature in FIG. 2.

FIG. 4 illustrates a schematic diagram showing another object representation 400 of the feature 200 from FIG. 2. In the object representation 400, the position and size of the feature 200 are the same as in FIG. 2. The location of the slices 202, 210, 212, 214, however, is different. In this example, the bottom-most point of the feature 220 is aligned with the slice 210. For example, the slice 210 is tangent to the feature 220.

Figure 5:
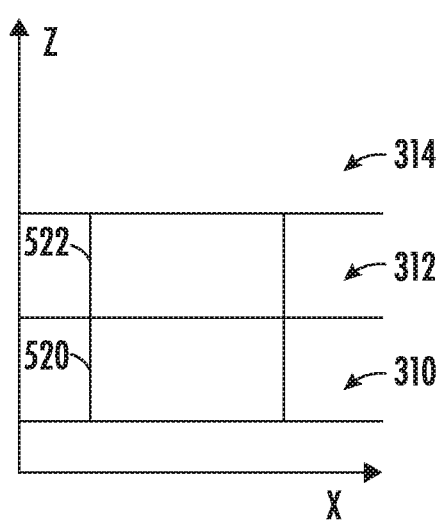
FIG. 5 illustrates a schematic diagram showing another layer representation of the feature in FIG. 4.

FIG. 5 illustrates a schematic diagram showing a layer representation of the feature 200 according to the slices in FIG. 4. The same slicing algorithm as discussed above regarding FIG. 3 is used. In this case, the feature 200 is represented by layer representation 520 in layer 310 and layer representation 522 in layer 312. Accordingly, the height of the feature 200 is not distorted along the z-axis. It should be appreciated that even if the feature 220 extended above the slice 214 such that a layer representation in layer 314 were added, the distortion in the z-axis would be limited to less than the height of one layer. Accordingly, by aligning the bottom-most point of the feature 200 with a slice 210, distortion in the z-dimension can be reduced.

FIG. 6 illustrates a schematic diagram showing an object representation 600 including a plurality of features. For example, the object representation 600 includes features 610, 620, 630, and 640. Each of the features 610, 620, 630, and 640 has the same dimensions, but is located at a different height along the z-axis. The slicing algorithm slices the features 610, 620, 630, and 640 at slices 210, 212, 214, 216, 218, and 219. In an aspect, many different parts that may be manufactured using AM techniques include repeated features. It is often desirable for the repeated features to have similar properties. For example, a turbine blade for an gas turbine engine may include a plurality of small cooling holes. It is desirable for each of the cooling holes, either in the blade itself, a mold, or a casting core, to be fabricated with identical properties, for example, to provide for modeling of the part performance.

FIG. 7 illustrates a schematic diagram showing a layer representation 700 of the plurality of features 610, 620, 630, and 640. As illustrated, the layer representation for each feature is different. For example, feature 610 is represented by layer segments 710 and 712 leading to a generally rectangular shape. Feature 620, however, is represented by layer segments 720, 722, and 724. Accordingly, feature 620 is distorted to be longer in the z-dimension than feature 610. Further, layer segment 710 and layer segment 720 begin at the same layer 312 on the z-axis although the corresponding features are located at different heights. Feature 630 is represented by layer segments 730, 732, and 734. While having the same height as the layer segments 720, 722, and 724 corresponding to feature 620, the layer segments 730, 732, and 734 have a different shape. For example, the layer representations for feature 630 may be narrow in the top layer, whereas the layer representations for feature 620 are wide at the top and narrow at the bottom. Feature 640 is represented by layer segments 740, 742, 744. The feature 640 has a similar representation as the feature 630, even though the features are at different heights because feature 630 and feature 640 have a similar offset from the respective closest slice. Accordingly, the slicing algorithm generates similar layer representations.

FIG. 8 illustrates a schematic diagram showing adjustments to the object representation of FIG. 6. The features 620, 630, and 640 are adjusted based on a reference feature 610. In an aspect, a reference feature 610 is chosen because a bottom-most point of the feature 610 is aligned with a slice 212. However, even if the relative location of the slices is unknown, the features can still be aligned with a reference feature based on offsets, as discussed in further detail below. In this example, the feature 620 is adjusted upward by an offset 820. The offset 820 is a difference between the bottom-most point of the feature 620 and the slice 214. Further, the offset 820 adjusts the feature 620 to have the same offset from the slice 214 as the feature 610 has from the slice 212, that is zero. The feature 630 is adjusted downward by the offset 830, which is the difference between the bottom-most point of the feature 630 and the nearest slice 214. Similarly, the feature 640 is adjusted downward by the offset 840, which is the difference between the bottom-most point of the feature 640 and the slice 212.

FIG. 9 illustrates a schematic diagram showing a layer representation 900 based on the adjusted object representation in FIG. 8. The feature 610 is represented by the layer segments 910 and 912. The feature 620 is represented by the layer segments 920 and 922, which have the same length as the layer segments 910 and 912, respectively. Similarly, the layer segments 930 and 932 representing feature 630 and the layer segments 940 and 942 representing feature 640 have the same size and shape as the layer segments 910 and 912, respectively. Accordingly, by adjusting the positions of the features 620, 630, and 640 within the object representation, the layer representation may more consistently represent the features. Therefore, when a part is built according to the layer representation, similar features within the part will be consistent. Moreover, in the case where the bottom-most point of the features are aligned with the slices, vertical distortion of the feature may be reduced.

In an aspect, from the perspective of the object representation or the CAD program, the slicing may occur at arbitrary z-axis values. For example, the slices may be based on computational efficiency or other factors that are not transparent to the CAD program or operator. The eventual locations of the slices may not be known in the CAD program. Generally, however, the slice height of the AM apparatus 100 will be known.

Figure 10:
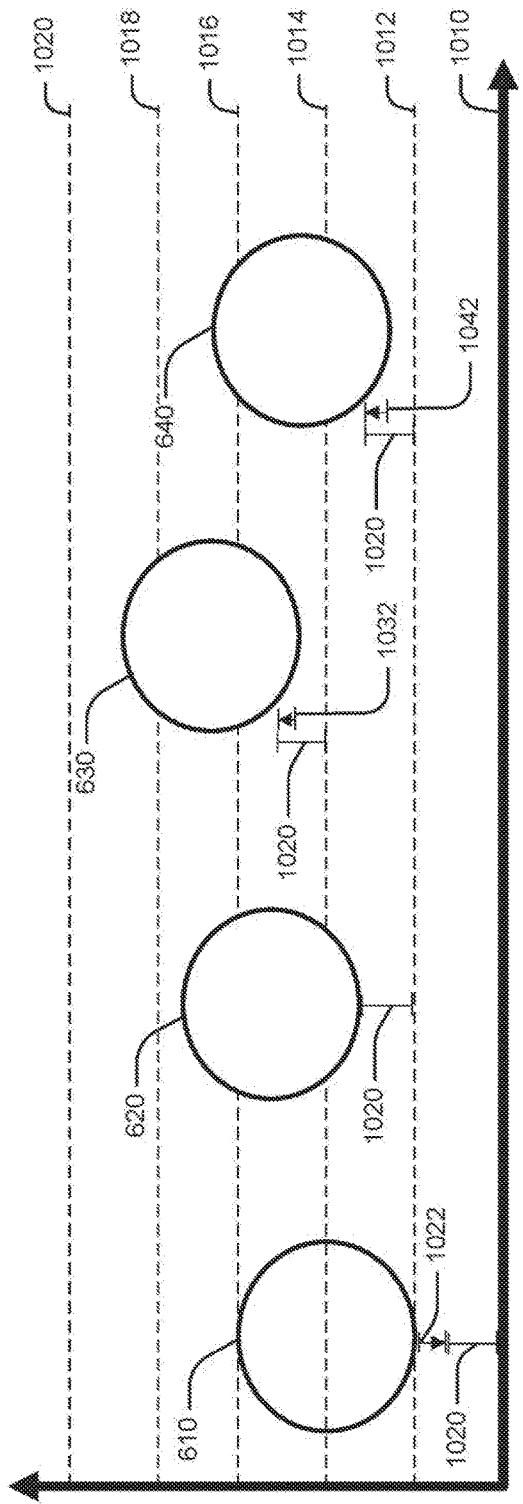
FIG. 10 illustrates another schematic diagram showing adjustments to the object representation of FIG. 6.

FIG. 10 illustrates a schematic diagram showing adjustments to the object representation of FIG. 6. In this example, the actual location of the slices is not known in advance. Hypothetical slices 1010, 1012, 1014, 1016, 1018, 1020 may be determined based on the build layer thickness scaled according to a model scale. The offset of the hypothetical slices with respect to the features may be arbitrary. For example, a first slice may be set at a bottom point of the CAD model and slices may be spaced from the first slice according to the build layer thickness scaled to the model scale. Any feature may be selected as a reference feature. For example, the feature 620 is selected as a reference feature. There is an offset 1020 between a bottom-most point of the feature 620 and the hypothetical slice 1012. In this example, the features 610, 630, and 640 are adjusted to have the same offset from a closest hypothetical slice. For example, the offset 1020 is added to the z-value of the hypothetical slice 1010 to determine a start position of the feature 610. Accordingly, the feature 610 is moved downward by the difference 1022 between the original bottom-most positon and the offset start position. The feature 620 is not moved because the feature 620 is selected as the reference feature and the bottom of feature 620 is aligned with the offset 1020. The feature 630 is adjusted upward by a difference 1032 such that the bottom of feature 630 is aligned with the z-value of the hypothetical slice 1014 plus the offset 1020. Similarly, the feature 1040 is adjusted upward by the offset 1042, which is the difference between the bottom-most point of the feature 640 and the z-value of the hypothetical slice 1012 plus the offset 1020.

Figure 11:
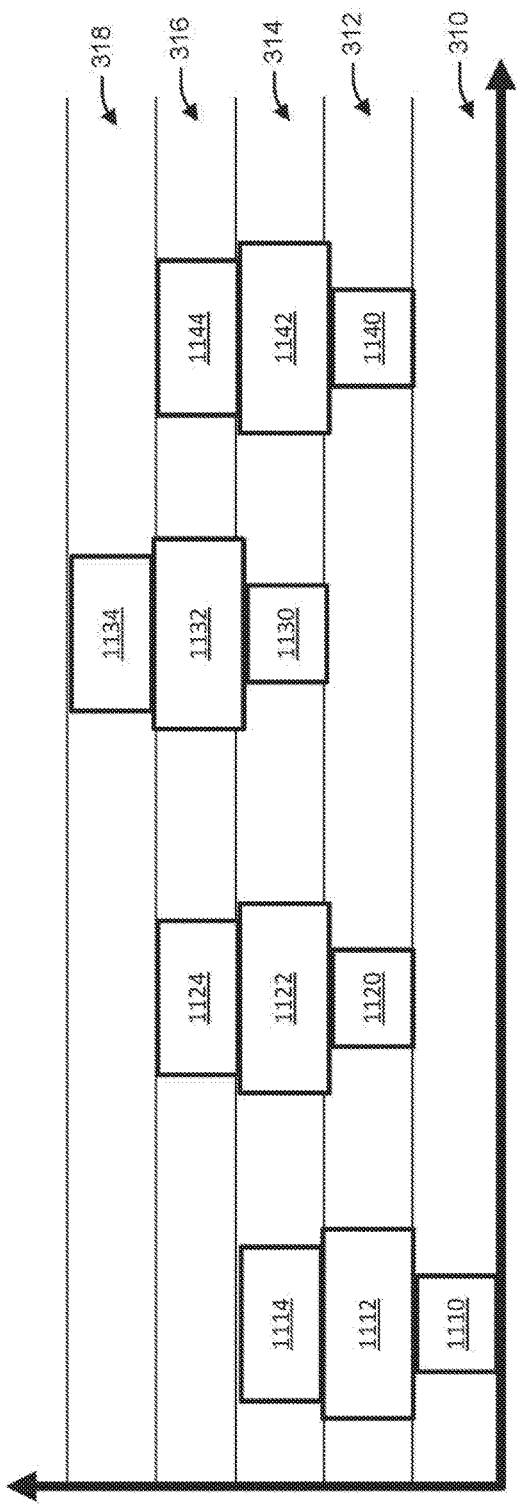
FIG. 11 illustrates another schematic diagram showing a layer representation of the adjusted object representation in FIG. 10.

FIG. 11 is a schematic diagram illustrating a layer representation of the object representation of FIG. 10 after the adjustments are made. Each feature 610, 620, 630, 640 is represented by a similar set of layer segments. For example, feature 610 is represented by layer segments 1110, 1112, and 1114. The bottom layer segments 1110, 1120, 1130, and 1140 representing each respective feature 610, 620, 630, 640 have the same size. Similarly the additional corresponding layer segments 1112, 1122, 1132, 1142 and 1114, 1124, 1134, 1144 have the same size. Accordingly, each of the features 610, 620, 630, and 640 are represented by a similar set of layer segments. The layer segments are located in the layers 310, 312, 314, 316, 318 according to the actual slices including the adjusted feature positions.

Although the present disclosure has been described with respect to an SLA AM process, it should be appreciated that other AM processes such as direct metal laser sintering (DMLS) and direct metal laser melting (DMLM) use similar layer based slicing techniques. Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques.

As another example, the techniques described herein can be applied to direct light processing (DLP). DLP differs from the above discussed powder bed and SLA processes in that the light curing of the polymer occurs through a window at the bottom of a resin tank that projects light upon a build platform that is raised as the process is conducted. With DLP an entire layer of cured polymer is produced simultaneously, and the need to scan a pattern using a laser is eliminated. Further, the polymerization occurs between the underlying window and the last cured layer of the object being built. One suitable DLP process is disclosed in U.S. Pat. No. 9,079,357 assigned to Ivoclar Vivadent AG and Technishe Universitat Wien, as well as WO 2010/045950 A1 and US 2011310370, each of which are hereby incorporated by reference.

Figure 1:
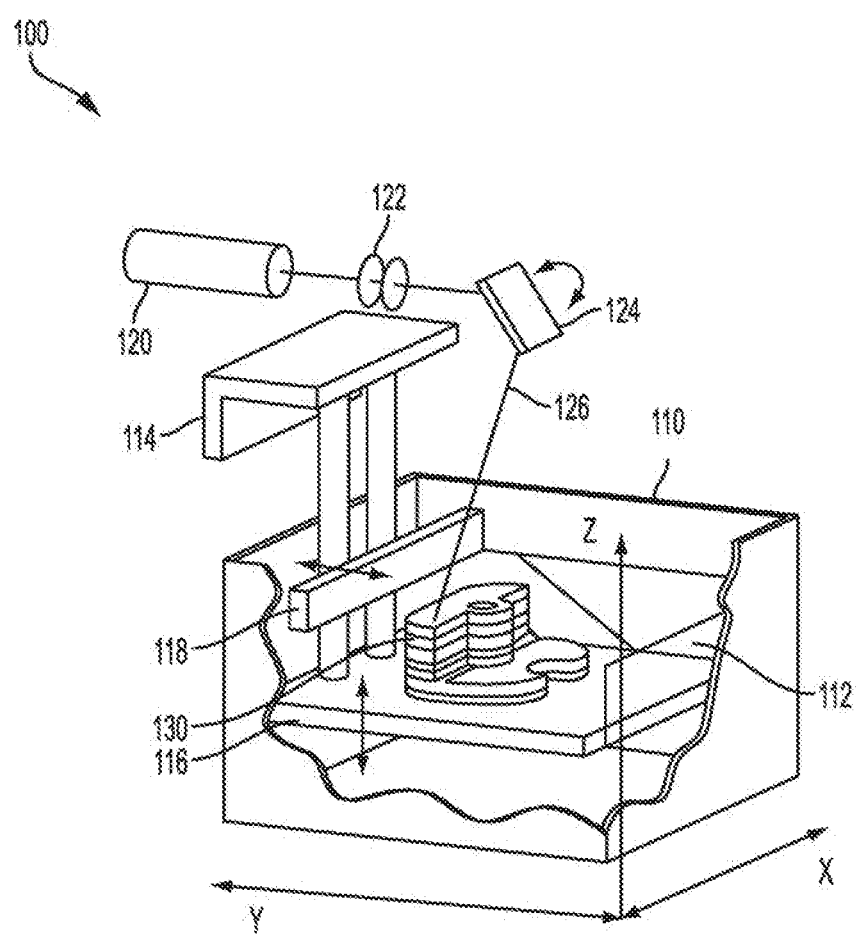
FIG. 1 is schematic diagram showing an example of a conventional apparatus for additive manufacturing.
Figure 12:
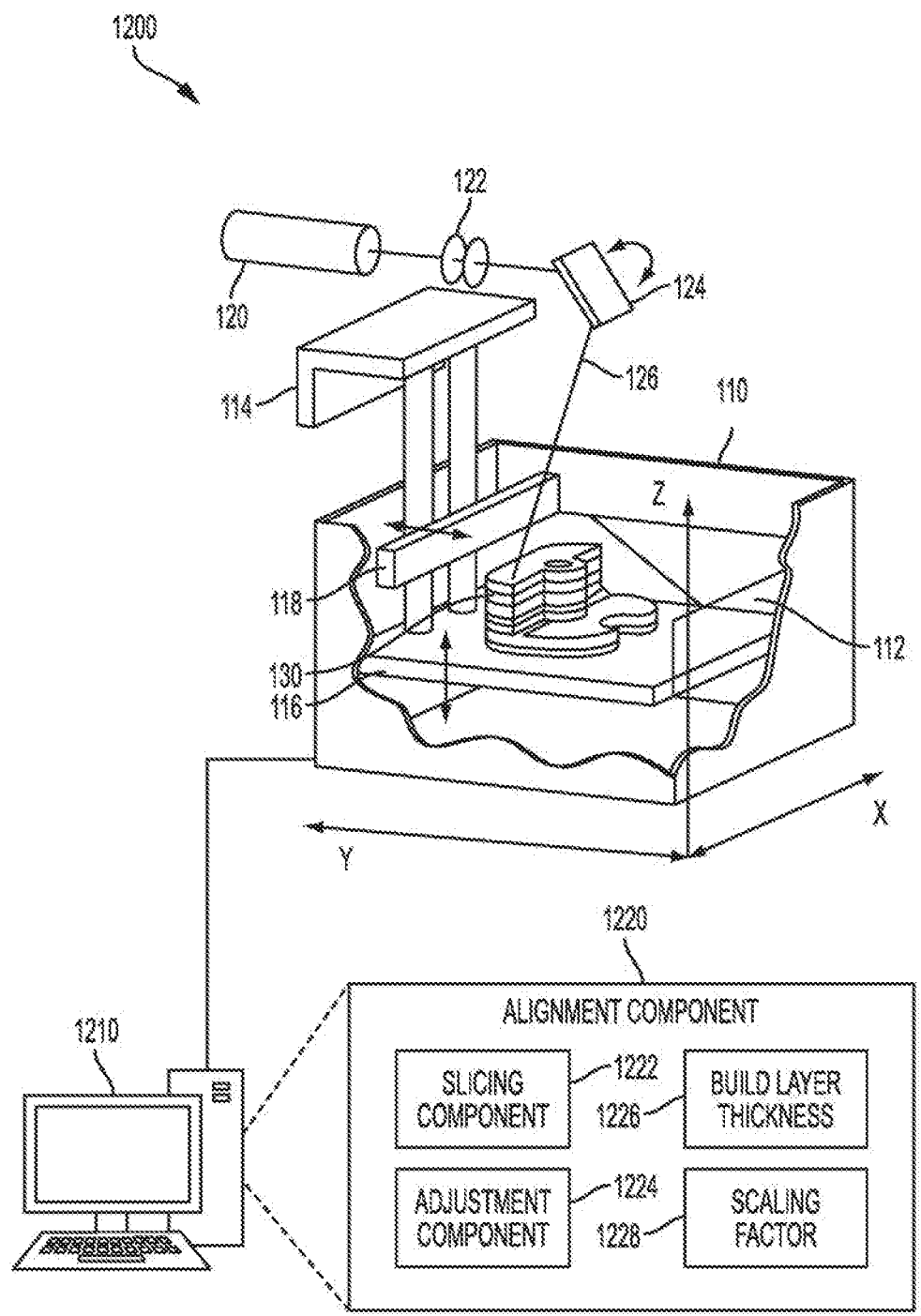
FIG. 12 illustrates a conceptual diagram showing components of an exemplary additive manufacturing system according to aspects of the disclosure.

FIG. 12 is a conceptual diagram showing components of an exemplary additive manufacturing system 1200 according to an aspect of the disclosure. In an aspect, the additive manufacturing system 1200 may be an SLA system that includes various components of the additive manufacturing apparatus 100 (FIG. 1) such as the vat 110, liquid photopolymer 112, elevator 114, build plate 116, recoater 118, laser 122, lenses 122, and scanning mirror 124. As mentioned above, the disclosed techniques may be used with other layer based additive manufacturing apparatuses and similar components may perform similar functions. For example, the additive manufacturing system 1200 may include a container that stores a raw material such as the vat 112, a tank having a translucent bottom portion in an DLP system, or a powder bed in a DLMS or powder ceramic system. The additive manufacturing system 1200 also includes a radiation source that solidifies the raw material when applied to the raw material. For example, the laser 120 is a radiation source and other radiation sources include an energy beam, and a light source (including ultra-violet light). The additive manufacturing system 1200 also includes a scanner that applies the radiation source to portions of the raw material within a current layer to form a portion of an object. The scanner may include the scanning mirror 124, a galvo scanner, or a modulator with which the intensity of a light source can be adjusted position-selectively under the control of a control unit. The additive manufacturing system 1200 also includes an elevator that moves the raw material or the object to change the current layer. The elevator may include the elevator 114, an adjustable build plate, or an elevator that moves the radiation source.

The additive manufacturing system 1200 also includes a computer 1210. The computer 1210 may be a separate computer or may be integrated with the above components of the additive manufacturing system 1200. The computer 1200 may include a digital processor communicatively coupled to a computer-readable medium such as a random access memory and/or hard drive. The computer-readable medium may store computer executable instructions that are executed by the processor to control the additive manufacturing system 1200. In an aspect, the computer executable instructions are firmware for controlling the additive manufacturing system 1200. In another aspect, the computer executable instructions include a CAD program and/or a standalone program for performing the techniques disclosed herein.

The computer 1210 includes an alignment component 1220. In an aspect, the alignment component 1220 is a processor configured execute computer executable instructions stored on a computer-readable storage medium. The alignment component 1220 includes a slicing component 1222 that is configured to generate layer representations of an object based on a 3D model of the object according to a slicing algorithm. For example, as discussed above, the slicing algorithm may average the positions of the object in a top slice and a bottom slice to determine the boundaries of the layer representation between the slices. The alignment component 1220 also includes an adjustment component 1224. The adjustment component 1224 may be configured to analyze a received 3D model of an object and adjust the position of one or more features in the z-dimension to align the features. The alignment component 1220 may include a memory storing a build layer thickness 1226 and a scaling factor 1228.

Figure 13:
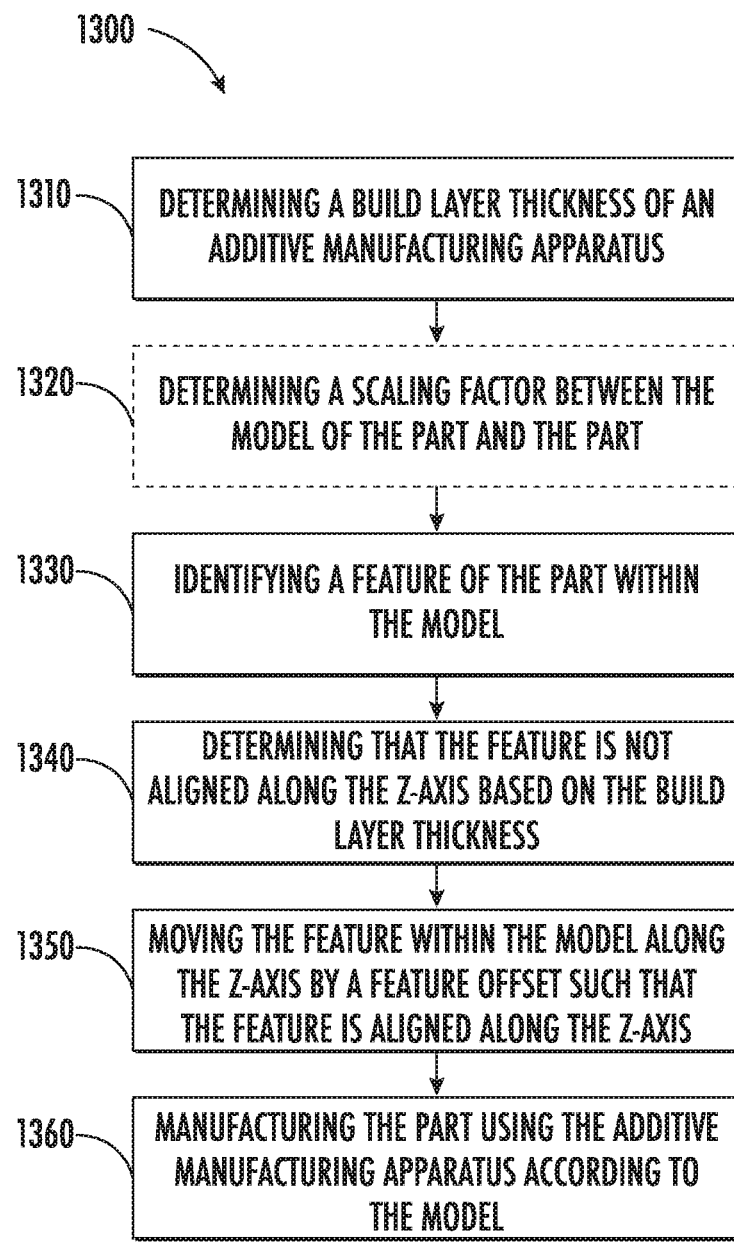
FIG. 13 illustrates a flowchart showing an exemplary method of manufacturing a part in a series of layers.

FIG. 13 is a flowchart illustrating an example method 1300 of manufacturing a part in a series of layers. The method 1300 is performed by a specially programmed computer (e.g., computer 1210) including an alignment component 1220. The specially programmed computer may further include an extension to the CAD program that performs the method 1300 or a separate program that controls the computer to perform the method 1300. The computer program may be stored on a non-transitory computer-readable storage medium as computer executable code for controlling the computer 1210 and/or the apparatus 100. In an aspect, the computer 1210 is communicatively coupled to an AM apparatus such as the additive manufacturing system 1200. The additive manufacturing system 1200 operates based on a three dimensional model of the part (e.g., part 130) having a first scale, i.e., a model scale. The model of the part is oriented according to an x-y build plane corresponding to an orientation of a layer of the part and a z-axis orthogonal to the x-y build plane that defines an order of each layer of the part.

In block 1310, the method 1300 includes determining a build layer thickness of an additive manufacturing apparatus. For example, the computer 1210 determines the build layer thickness 1226 of the additive manufacturing apparatus 100. In an aspect, the computer 1210 communicates with the apparatus 100 to receive a current setting of the apparatus 100 for the build layer thickness. In another aspect, an operator enters the build layer thickness for the apparatus 100.

In block 1320, the method 1300 includes optionally determining a scaling factor between the model of the part and the part. In an aspect, the model includes the actual dimensions of the part 130 and the scaling factor is 1. In another aspect, the computer 1210 scales the model based on the properties of the apparatus 100 such as a maximum build dimension. For example, when performing the slicing algorithm to generate the layer representation, the additive manufacturing system 1200 scales the build layer thickness by the scaling factor to determine the location of slices within the 3D model. The computer 1210 communicates with the apparatus 100 to receive a current scaling factor 1228 for the apparatus 100. In another aspect, an operator enters the scaling factor 1228 for the model and/or the apparatus 100.

In block 1330, the method 1300 includes identifying a feature of the part within the model. In an aspect, the computer 1210 identifies the feature of the part within the model. For example, the computer 1210 may execute adjustment component 1224 to analyze the model and identify features. In an aspect, the computer 1210 identifies features that are duplicates. For example, the computer 1210 identifies a set of features having common properties such as dimensions. In another aspect, the computer 1210 identifies features having critical dimensions. For example, fidelity generally becomes more important as the dimensions of the feature approach the build layer thickness. Accordingly, the computer 1210 may identify features having dimensions on the same order of magnitude as the build layer thickness. For example, the computer 1210 may identify features having a height along the z-axis less than 10 times the build layer thickness, preferably less than 5 times the build layer thickness. Similarly, fidelity with respect to dimensions of a space between features may be important, so the computer 1210 may identify features with less than 10 times the build layer thickness between the features. In another aspect, an operator may identify one or more features by selecting the features using a user interface. In an aspect, identifying a feature includes identifying a bottom-most point of the feature along the z-axis. The bottom-most point may be a point of the feature having the lowest z-coordinate. A CAD model may locate certain features (e.g., circular features) according to a central point or other reference point. The computer 1210 may calculate the bottom-most point based on the definition of the feature.

In block 1340, the method 1300 includes determining that the feature is not aligned along the z-axis based on the build layer thickness. In an aspect, determining that the feature is not aligned includes determining that the bottom-most point of the feature is not located at a bottom of a build layer. If the locations of the slices are known, the bottom of the build layer may correspond to a z-value of a slice. The computer 1210 may compare the z-value of the bottom-most point of the feature to the z-value of the nearest slice. In an aspect, determining the positions of the build layer may be based on a scaling factor between an additive manufacturing apparatus and the model. The build layer thickness may be scaled by the scaling factor to determine at least the distance between slices within the 3D model.

In another aspect, determining that the feature is not aligned includes: determining a first offset between the bottom-most point of the feature and the bottom of a build layer nearest to the bottom-most point; determining a second offset between the bottom-most point of a reference feature and the bottom of a build layer nearest to the reference feature; and determining that the first offset is different than the second offset. When the feature has a different offset than the reference feature, than the feature is not aligned with the reference feature. Accordingly, a feature may not be aligned with the reference feature even if the feature is aligned with a build layer.

In another aspect, determining that the feature is not aligned comprises: determining a difference between a value of a position of a bottom-most point of the feature along the z-axis and a value of a position of a bottom-most point of a reference feature along the z-axis; scaling the build layer thickness based on the scaling factor; and determining that the difference is not a multiple of the scaled build layer thickness. In this example, the alignment of the feature may be determined without reference to actual layer boundaries or slice locations. Instead, the computer 1210 determines whether the feature is aligned with the reference feature based on the scaled build layer thickness.

In block 1350, the method 1300 includes moving the feature within the model along the z-axis by a feature offset such that the feature is aligned along the z-axis. The computer 1210 moves the feature within the model along the z-axis by a feature offset such that the feature is aligned along the z-axis. The computer 1210 may determine the feature offset based on the alignment of the feature. In an aspect, the computer 1210 determines that the feature offset is a difference between the bottom-most point of the feature and the bottom of a nearest build layer. In another aspect, the computer 1210 determines that the feature offset is a difference between the first offset and the second offset. In another aspect, the computer 1210 determines that the feature offset is a result of a modulus operation on the difference between the respective bottom-most points of the feature and the reference feature and the scaled build layer thickness. The computer 1210 moves the feature by the determined feature offset. For example, the computer 1210 adds the feature offset (positive or negative) to the z-value of the feature as the feature is defined in the model.

In block 1360, the method 1300 includes manufacturing the part using the additive manufacturing apparatus according to the model. In an aspect, the computer 1210 controls the additive manufacturing system 1200 according to the adjusted CAD model to manufacture the part based on the CAD model. In another aspect, the computer 1210 provides the CAD model to the additive manufacturing apparatus 100 and the additive manufacturing apparatus 100 manufactures the part based on the CAD model. For example, the apparatus 100 performs a slicing algorithm to obtain layer representations of the CAD model. The apparatus 100 then fabricates the part based on the layer representations.

Although the method 1300 has been described with respect to an SLA AM process, it should be appreciated that other AM processes such as DMLS, DMLM, DLP, or powder based ceramics that use similar layer based slicing techniques. Accordingly, the method 1300 may be used with any additive manufacturing process or apparatus that uses a slicing algorithm to determine a layer representation of a part to be fabricated.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

Further aspects of the invention are provided by the subject matter of the following clauses:

1. A method of manufacturing a part in a series of layers based on a three dimensional model of the part, the model of the part oriented according to an x-y build plane corresponding to an orientation of a layer of the part and a z-axis orthogonal to the x-y build plane that defines an order of each layer of the part between a bottom and a top of the part, the method comprising determining a build layer thickness of an additive manufacturing apparatus; identifying a reference feature of the part within the model and an associated reference position along the z-axis of the reference feature; identifying a first feature of the part within the model and an associated feature position along the z-axis of the first feature; determining a difference between the reference position and the feature position along the z-axis; and moving the first feature within the model along the z-axis by a feature offset such that the difference is zero or one or more increments of the build layer thickness.
2. The method of clause 1, further comprising determining that the first feature will have distortion along the z-axis based on whether the difference is not a multiple of the build layer thickness.
3. The method of any preceding clause, wherein the reference position of the reference feature is a bottom-most point along the z-axis of the reference feature, and wherein the feature position is a bottom-most point along the z-axis of the first feature.
4. The method of any preceding clause, further comprising dividing the model into a plurality of hypothetical build layers along the z-axis, each hypothetical build layer extending along the x-y build plane, each hypothetical build layer defining the build layer thickness along the z-axis.
5. The method of any preceding clause, wherein the reference feature defines a reference offset between the reference position of the reference feature and a bottom-most position along the z-axis of one hypothetical build layer of the plurality of hypothetical build layers, and wherein moving the first feature within the model along the z-axis by the feature offset further comprising moving the first feature within the model by the feature offset such that the feature position of the first feature is separated from the bottom-most position along the z-axis of one hypothetical build layer of the plurality of hypothetical build layers by the reference offset.
6. The method of any preceding clause, further comprising determining that the first feature will have distortion along the z-axis based on whether the feature position of the first feature is separated from the bottom-most position along the z-axis of the one hypothetical build layer of the plurality of hypothetical build layers by the reference offset.
7. The method of any preceding clause, wherein dividing the model into the plurality of hypothetical build layers along the z-axis comprises dividing the model into the plurality of hypothetical build layers along the z-axis such that reference position of the reference feature is aligned with a bottom-most position along the z-axis of one hypothetical build layer of the plurality of hypothetical build layers, and wherein moving the first feature within the model along the z-axis by the feature offset further comprising moving the first feature within the model by the feature offset such that the feature position of the first feature is aligned with a bottom-most position along the z-axis of one hypothetical build layer of the plurality of hypothetical build layers.
8. The method of any preceding clause, further comprising determining that the first feature will have distortion along the z-axis based on whether the feature position of the first feature is aligned with the bottom-most position along the z-axis of the one hypothetical build layer of the plurality of hypothetical build layers.
9. The method of any preceding clause, further comprising identifying a plurality of duplicate features within the model, wherein the plurality of duplicate features comprises the reference feature and the first feature.
10. The method of any preceding clause, wherein identifying the plurality of duplicate features within the model comprises analyzing the model to determine the plurality of duplicate features define at least one common property.
11. The method of any preceding clause, wherein identifying the plurality of duplicate features within the model comprises identifying the plurality of duplicate features each define a critical dimension.
12. The method of any preceding clause, wherein the critical dimension comprises a thickness along the z-axis less than ten times the build layer thickness.
13. The method of any preceding clause, wherein the critical dimension comprises a thickness along the z-axis less than five times the build layer thickness.
14. The method of any preceding clause, wherein determining the build layer thickness of the additive manufacturing apparatus comprises receiving an input from an operator indicative of the build layer thickness.
15. The method of any preceding clause, further comprising dividing the model into a plurality of build layers by a plurality of slices based on the build layer thickness.

16. The method of any preceding clause, wherein dividing the model into the plurality of build layers occurs after moving the first feature within the model.

17. The method of any preceding clause, further comprising dividing the model into a plurality of hypothetical build layers along the z-axis, each hypothetical build layer extending along the x-y build plane, each hypothetical build layer defining the build layer thickness along the z-axis.

18. The method of any preceding clause, wherein dividing the model into the plurality of hypothetical build layers along the z-axis comprises dividing the model into the plurality of hypothetical build layers along the z-axis such that dividing the model into the plurality of build layers by the plurality of slices based on the build layer thickness aligns each build layer of the plurality of build layers with one hypothetical build layer of the plurality of hypothetical build layers.

19. The method of any preceding clause, further comprising manufacturing the part using the additive manufacturing apparatus on a layer by layer basis according to the model, including layers having the build layer thickness.

20. A method of manufacturing a part in a series of layers based on a three dimensional model of the part, the model of the part oriented according to an x-y build plane corresponding to an orientation of a layer of the part and a z-axis orthogonal to the x-y build plane that defines an order of each layer of the part between a bottom and a top of the part, the method comprising determining a build layer thickness of an additive manufacturing apparatus; identifying a reference feature of the part within the model and an associated reference position along the z-axis of the reference feature; identifying a plurality of features of the part within the model and an associated feature position along the z-axis of each feature of the plurality of features; determining a difference between the reference position of the reference feature and the feature position of each feature of the plurality of features; determining that at least one feature of the plurality of features will have distortion along the z-axis based on whether the difference is not a multiple of the build layer thickness; and moving the at least one feature of the plurality of features within the model along the z-axis by at least one feature offset such that the difference is zero or one or more increments of the build layer thickness for each feature of the plurality of features.

The invention claimed is:

1. A method of manufacturing a part in a series of layers based on a three dimensional model of the part, the model of the part oriented according to an x-y build plane corresponding to an orientation of a layer of the part and a z-axis orthogonal to the x-y build plane that defines an order of each layer of the part between a bottom and a top of the part, the method comprising:
   determining a build layer thickness of an additive manufacturing apparatus;
   identifying a reference feature of the part within the model and an associated reference position along the z-axis of the reference feature;
   identifying a first feature of the part within the model and an associated feature position along the z-axis of the first feature;
   determining a difference between the reference position and the feature position along the z-axis; and
   moving the first feature within the model along the z-axis by a feature offset such that the difference is zero or one or more increments of the build layer thickness.

2. The method of claim 1, further comprising:
   determining that the first feature will have distortion along the z-axis based on whether the difference is not a multiple of the build layer thickness.

3. The method of claim 1, wherein the reference position of the reference feature is a bottom-most point along the z-axis of the reference feature, and wherein the feature position is a bottom-most point along the z-axis of the first feature.

4. The method of claim 1, further comprising:
   dividing the model into a plurality of hypothetical build layers along the z-axis, each hypothetical build layer extending along the x-y build plane, each hypothetical build layer defining the build layer thickness along the z-axis.

5. The method of claim 4, wherein the reference feature defines a reference offset between the reference position of the reference feature and a bottom-most position along the z-axis of one hypothetical build layer of the plurality of hypothetical build layers, and
   wherein moving the first feature within the model along the z-axis by the feature offset further comprising moving the first feature within the model by the feature offset such that the feature position of the first feature is separated from the bottom-most position along the z-axis of one hypothetical build layer of the plurality of hypothetical build layers by the reference offset.

6. The method of claim 5, further comprising:
   determining that the first feature will have distortion along the z-axis based on whether the feature position of the first feature is separated from the bottom-most position along the z-axis of the one hypothetical build layer of the plurality of hypothetical build layers by the reference offset.

7. The method of claim 4, wherein dividing the model into the plurality of hypothetical build layers along the z-axis comprises dividing the model into the plurality of hypothetical build layers along the z-axis such that reference position of the reference feature is aligned with a bottom-most position along the z-axis of one hypothetical build layer of the plurality of hypothetical build layers, and
   wherein moving the first feature within the model along the z-axis by the feature offset further comprising moving the first feature within the model by the feature offset such that the feature position of the first feature is aligned with a bottom-most position along the z-axis of one hypothetical build layer of the plurality of hypothetical build layers.

8. The method of claim 7, further comprising:
   determining that the first feature will have distortion along the z-axis based on whether the feature position of the first feature is aligned with the bottom-most position along the z-axis of the one hypothetical build layer of the plurality of hypothetical build layers.

9. The method of claim 1, further comprising:
   identifying a plurality of duplicate features within the model, wherein the plurality of duplicate features comprises the reference feature and the first feature.

10. The method of claim 9, wherein identifying the plurality of duplicate features within the model comprises analyzing the model to determine the plurality of duplicate features define at least one common property.

11. The method of claim 9, wherein identifying the plurality of duplicate features within the model comprises identifying the plurality of duplicate features each define a critical dimension.

12. The method of claim 11, wherein the critical dimension comprises a thickness along the z-axis less than ten times the build layer thickness.

13. The method of claim 11, wherein the critical dimension comprises a thickness along the z-axis less than five times the build layer thickness.

14. The method of claim 1, wherein determining the build layer thickness of the additive manufacturing apparatus comprises receiving an input from an operator indicative of the build layer thickness.

15. The method of claim 1, further comprising:
dividing the model into a plurality of build layers by a plurality of slices based on the build layer thickness.

16. The method of claim 15, wherein dividing the model into the plurality of build layers occurs after moving the first feature within the model.

17. The method of claim 15, further comprising:
dividing the model into a plurality of hypothetical build layers along the z-axis, each hypothetical build layer extending along the x-y build plane, each hypothetical build layer defining the build layer thickness along the z-axis.

18. The method of claim 17, wherein dividing the model into the plurality of hypothetical build layers along the z-axis comprises dividing the model into the plurality of hypothetical build layers along the z-axis such that dividing the model into the plurality of build layers by the plurality of slices based on the build layer thickness aligns each build layer of the plurality of build layers with one hypothetical build layer of the plurality of hypothetical build layers.

19. The method of claim 1, further comprising:
manufacturing the part using the additive manufacturing apparatus on a layer by layer basis according to the model, including layers having the build layer thickness.

20. A method of manufacturing a part in a series of layers based on a three dimensional model of the part, the model of the part oriented according to an x-y build plane corresponding to an orientation of a layer of the part and a z-axis orthogonal to the x-y build plane that defines an order of each layer of the part between a bottom and a top of the part, the method comprising:
determining a build layer thickness of an additive manufacturing apparatus;
identifying a reference feature of the part within the model and an associated reference position along the z-axis of the reference feature;
identifying a plurality of features of the part within the model and an associated feature position along the z-axis of each feature of the plurality of features;
determining a difference between the reference position of the reference feature and the feature position of each feature of the plurality of features;
determining that at least one feature of the plurality of features will have distortion along the z-axis based on whether the difference is not a multiple of the build layer thickness; and moving the at least one feature of the plurality of features within the model along the z-axis by at least one feature offset such that the difference is zero or one or more increments of the build layer thickness for each feature of the plurality of features.

* * * * *